US009344436B1

(12) United States Patent
Sheng et al.

(10) Patent No.: US 9,344,436 B1
(45) Date of Patent: May 17, 2016

(54) PROXIMITY-BASED AND USER-BASED ACCESS CONTROL USING WEARABLE DEVICES

(71) Applicant: FMR LLC, Boston, MA (US)

(72) Inventors: Xinxin Sheng, Cary, NC (US); Hong Sun, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/931,634

(22) Filed: Nov. 3, 2015

(51) Int. Cl.
H04L 29/06 (2006.01)
H04W 12/08 (2009.01)
H04W 4/02 (2009.01)
G06F 21/62 (2013.01)

(52) U.S. Cl.
CPC .......... H04L 63/107 (2013.01); G06F 21/6245 (2013.01); H04L 63/0853 (2013.01); H04L 63/0876 (2013.01); H04L 63/105 (2013.01); H04W 4/021 (2013.01); H04W 4/026 (2013.01); H04W 12/08 (2013.01)

(58) Field of Classification Search
CPC G06F 21/35; G07C 2209/64; G07C 9/00126; H04L 2463/082; H04L 63/08; H04L 63/105; H04L 63/107; H04L 63/0876; H04W 12/08; H04W 12/06; H04W 4/021; H04W 12/00
See application file for complete search history.

(56) References Cited

U.S. PATENT DOCUMENTS

| 8,396,452 | B1 | 3/2013 | Matsuoka | |
| 8,625,796 | B1 | 1/2014 | Ben Ayed | |
| 8,715,178 | B2 | 5/2014 | Price et al. | |
| 2003/0204526 | A1* | 10/2003 | Salehi-Had | G06F 21/35 |
| 2006/0136741 | A1* | 6/2006 | Mercredi | G06F 21/32 713/185 |
| 2007/0004381 | A1* | 1/2007 | Larson | G06F 21/35 455/411 |
| 2007/0194882 | A1* | 8/2007 | Yokota | G06F 21/34 340/5.61 |
| 2010/0274859 | A1* | 10/2010 | Bucuk | H04L 63/08 709/206 |
| 2010/0328073 | A1* | 12/2010 | Nikitin | G01S 5/0247 340/572.1 |
| 2011/0241838 | A1* | 10/2011 | Wischmeyer | G06F 21/35 340/10.1 |
| 2011/0321118 | A1* | 12/2011 | Boldyrev | G06F 21/35 726/1 |
| 2012/0055726 | A1 | 3/2012 | Hannon | |

(Continued)

FOREIGN PATENT DOCUMENTS

WO 2009138955 A2 11/2009
WO 2015067942 A1 5/2015

OTHER PUBLICATIONS

"Imprivata OneSign Secure Walk-Away," retrieved from www.imprivata.com, 2015, 2 pages.

(Continued)

Primary Examiner — Darren B Schwartz
(74) Attorney, Agent, or Firm — Proskauer Rose LLP

(57) ABSTRACT

Methods and apparatuses are described for proximity-based and user-based access control using wearable devices. A short-range frequency reader coupled to a target device detects a plurality of wearable devices in proximity to the reader, each wearable device comprising a short-range frequency antenna. The reader identifies, for each wearable device, a user wearing the wearable device. The reader determines, for each wearable device, a distance from the reader and an orientation in relation to the target device. The reader determines a level of access available to the target device based upon the identity of each user, the distance of each wearable device from the reader, the orientation of each wearable device in relation to the target device, and the distance of the wearable devices from each other in a three-dimensional space.

13 Claims, 2 Drawing Sheets

(56) References Cited

U.S. PATENT DOCUMENTS

| | | | |
|---|---|---|---|
| 2012/0075062 A1* | 3/2012 | Osman | G07C 9/00087 340/5.61 |
| 2013/0263206 A1* | 10/2013 | Nefedov | G06F 21/6218 726/1 |
| 2013/0291056 A1 | 10/2013 | Gaudet et al. | |
| 2014/0052567 A1 | 2/2014 | Bhardwaj et al. | |
| 2014/0096215 A1* | 4/2014 | Hessler | H04L 63/0869 726/7 |
| 2014/0109243 A1 | 4/2014 | Ting et al. | |
| 2014/0123249 A1* | 5/2014 | Davis | G06F 21/44 726/5 |
| 2014/0189786 A1* | 7/2014 | Castro | H04L 63/105 726/1 |
| 2015/0039880 A1* | 2/2015 | Aminzade | H04L 41/0816 713/100 |
| 2015/0082406 A1* | 3/2015 | Park | H04L 63/0853 726/9 |
| 2015/0113620 A1* | 4/2015 | Brewer | H04W 12/06 726/7 |
| 2015/0227727 A1* | 8/2015 | Grigg | G06F 21/31 726/4 |
| 2015/0244699 A1* | 8/2015 | Hessler | H04W 12/06 726/7 |
| 2015/0317649 A1* | 11/2015 | Joshi | G01C 21/20 705/7.32 |
| 2016/0050183 A1* | 2/2016 | Biswas | H04L 63/04 726/26 |
| 2016/0050204 A1* | 2/2016 | Anderson | H04L 63/0876 726/4 |
| 2016/0055692 A1* | 2/2016 | Trani | G07C 9/00007 340/5.61 |

OTHER PUBLICATIONS

"Xyloc Full-Time Workstation Security," retrieved from http://www.ensuretech.com/wp-content/uploads/2011/08/xyloc-overview-brochure.pdf, 2009, 4 pages.

* cited by examiner

PROXIMITY-BASED AND USER-BASED ACCESS CONTROL USING WEARABLE DEVICES

TECHNICAL FIELD

This application relates generally to methods and apparatuses, including computer program products, for proximity-based and user-based access control using wearable devices.

BACKGROUND

With the advent of computer-based technology, security of data, user authorization, and access control are important concerns. Typically, some form of a token is used to grant access to data, applications, services, functions, and the like. For example, a private computer system may require a user to enter his username and password in order to log in and gain access to secure data. In another example, a smart phone may require a user to place her finger on a designated area in order to read her fingerprint and authorize access to the device. In yet another example, a secure video conferencing application may require visual analysis of a user's face to perform facial recognition.

Generally, these types of authorizations take a matter of seconds to perform (e.g., typing in a username and password to login). In some cases, a keyboard, mouse, or other typical computer-based input device is not a standard part of the system, such as typing with a television remote control to access parental-controlled channels. And, there are situations where implementing password authentication is burdensome, such as to lock a medicine cabinet, turn on a TV, or unlock a gate. In addition, there are situations where users may have limited ability to perform such password input, e.g., small children, people with certain disabilities, or for perhaps even someone with their hands full. For these types of scenarios, standard authorization techniques can be inconvenient or inoperable.

Another general problem is that the authorization is typically a binary resolution—access is either granted or denied. For example, if a person is given a door key, the key will always open the door. If a person submits a password to a computer system, the computer system will always allow the user to access secure data or applications. As a result, if access needs to be adjusted according to a specific scenario, timeframe, or set of circumstances, a computer system will likely require additional rules and logic to support such access. Examples include allowing a child to watch TV during a particular period of time (e.g., 5:00-6:00 pm), or allowing employees to bring family members to the office for an annual holiday party, which is normally restricted to employee access only. The granularity and complexity involved in evaluating and granting or denying such authorization creates challenging situations.

SUMMARY

Therefore, methods and systems are needed to enable user authorization and access control to various secure data, applications, device functions, and environments without requiring standard authentication techniques (such as entry of a password) while also accounting for particular, user-driven and user-specific scenarios. The methods, systems, and techniques described herein provide the advantage of leveraging wearable device technology to conduct computerized, proximity-based authorization and access control workflows that are tailored to a user's specific needs and can account for workflows where the presence of multiple users must be considered in order to resolve the authentication and access control successfully.

The invention, in one aspect, features a method for proximity-based and user-based access control using wearable devices. A short-range frequency reader coupled to a target device detects a plurality of wearable devices in proximity to the reader, each wearable device comprising a short-range frequency antenna. The reader identifies, for each wearable device, a user wearing the wearable device. The reader determines, for each wearable device, a distance from the reader and an orientation in relation to the target device. The reader determines a level of access available to the target device based upon the identity of each user, the distance of each wearable device from the reader, the orientation of each wearable device in relation to the target device, and the distance of the wearable devices from each other in a three-dimensional space.

The invention, in another aspect, features a system for proximity-based and user-based access control using wearable devices. The system comprises a short-range frequency reader coupled to a target device. The reader is configured to detect a plurality of wearable devices in proximity to the reader, each wearable device comprising a short-range frequency antenna. The reader is configured to identify, for each wearable device, a user wearing the wearable device. The reader is configured to determine, for each wearable device, a distance from the reader and an orientation in relation to the target device. The reader is configured to determine a level of access available to the target device based upon the identity of each user, the distance of each wearable device from the reader, the orientation of each wearable device in relation to the target device, and the distance of the wearable devices from each other in a three-dimensional space.

The invention, in another aspect, features a computer program product, tangibly embodied in a non-transitory, computer-readable storage device, for proximity-based and user-based access control using wearable devices. The computer program product includes instructions operable to cause a short-range frequency reader coupled to a target device to detect a plurality of wearable devices in proximity to the reader, each wearable device comprising a short-range frequency antenna. The computer program product includes instructions operable to cause the reader to identify, for each wearable device, a user wearing the wearable device. The reader is configured to determine, for each wearable device, a distance from the reader and an orientation in relation to the target device. The computer program product includes instructions operable to cause the reader to determine a level of access available to the target device based upon the identity of each user, the distance of each wearable device from the reader, the orientation of each wearable device in relation to the target device, and the distance of the wearable devices from each other in a three-dimensional space.

Each of the above aspects can include one or more of the following features. In some embodiments, identifying a user wearing the wearable device comprises receiving, from the wearable device, a unique identifier stored in memory of the wearable device, retrieving, by the reader, a user profile that corresponds to the unique identifier from a server computing device, and identifying, by the reader, the user based upon the user profile. In some embodiments, the reader determines a role for each identified user based upon the user profile, and adjusts the level of access available to the target device based upon the determined roles for each identified user.

In some embodiments, determining a level of access available to the target device comprises receiving, from the target device, an access request from an input device coupled to the target device, and determining, by the reader, whether to grant the access request based upon the identity of each user, the distance of each wearable device from the reader, the orientation of each wearable device in relation to the reader, and the distance of the wearable devices from each other in a three-dimensional space. In some embodiments, the level of access available to the target device changes as the distance and orientation of each wearable device changes.

In some embodiments, the level of access available to the target device is no access. In some embodiments, the wearable devices and the reader communicate using a short-range communication protocol. In some embodiments, at least one of the distance or the orientation is determined using a magnitude map generated from magnetic field signatures of the wearable devices.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
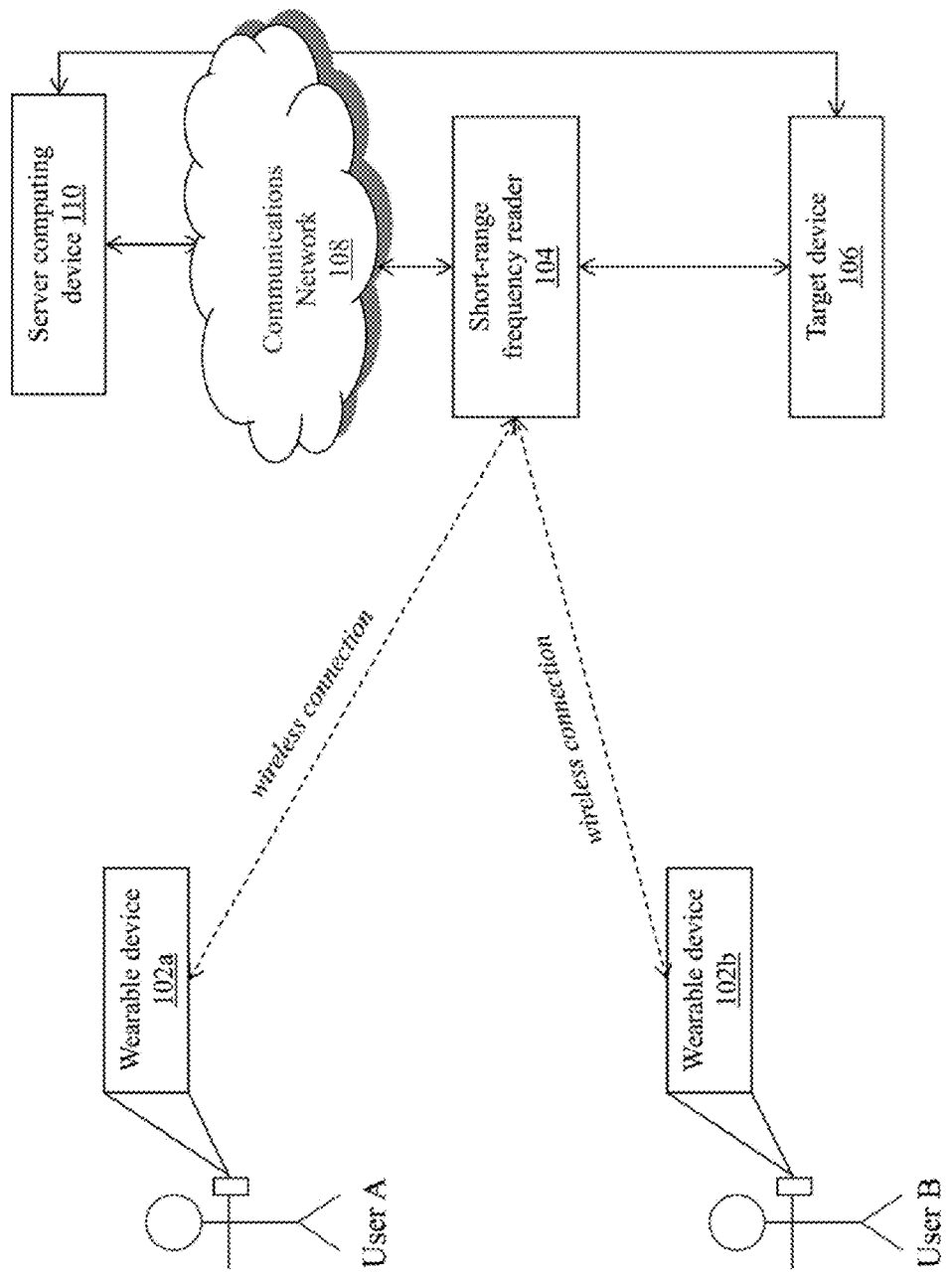
FIG. 1 is a block diagram of a system for proximity access control using wearable devices.

FIG. 1 is a block diagram of a system 100 for proximity access control using wearable devices. The system 100 includes a plurality of wearable devices 102a-102b, a short-range frequency reader 104 that is coupled to a target device 106. In some embodiments, the short-range frequency reader 104 and the target device 106 are a single device, with the reader 104 being embedded as a component of the target device 106. In some embodiments, the short-range frequency reader 104 and/or the target device 106 are connected to a server computing device 110 via a communications network 108.

The wearable devices 102a-102b are preferably small electronic devices that can be worn by a user (e.g., a wristband) or affixed to the user (e.g., a clip attached to the user's clothing or secured to the user's skin). The wearable devices 102a-102b generally include circuitry such as a processor or chip, wiring, and related hardware (e.g., transceiver, antenna) that provide the capability of communicating wirelessly with the reader 104 via a short-range communication protocol and/or frequency. Exemplary wearable devices can include, but are not limited to, fabrics with integrated wiring and sensors; medical devices for in-hospital use such as heart-rate monitors; radio-frequency identification (RFID) or near-field communication (NFC) wristbands; smart watches and fitness bands that keep track of the user's vital signs; Bluetooth headsets or earpieces; smart glasses such as Google® Glass; electronic jewelry having short-range communication capabilities; and clothing with embedded light-emitting diodes (LEDs) to display custom messages or artwork.

The short-range frequency reader 104 is preferably a small computing device equipped with a processor, memory, and communication hardware (such as an antenna, transceiver, and the like) that is capable of communicating with the wearable devices 102a-102b via short-range communication protocol and/or frequency. Exemplary readers 104 can include but are not limited to mobile devices, smartphones, tablets, laptop computers, RFID/NFC readers, and the like. The reader 104 can communicate with the wearable devices 102a-102b via a number of different short-range communication protocols and/or frequencies, such as Bluetooth, RFID, NFC, magnetic fields, or WiFi. The reader 104 is capable of transmitting a signal to the wearable devices 102a-102b and receiving a signal from the devices 102a-102b, and further determining a distance of the wearable device from the reader 104 and an orientation of the wearable device relative to the reader 104 based upon the exchange of signals between the reader and the device.

The target device 106 is an electronic device coupled to the short-range frequency reader 104, to which access is granted or denied (or certain functionality of the target device 106 is enabled or disabled) based upon the distance of the wearable devices 102a-102b from the short-range frequency reader 104 and the orientation of the wearable devices 102a-102b in relation to the target device 106. The target device 106 can be any type of electronic device with functionality or capabilities that can be managed or controlled. Exemplary target devices 106 include, but are not limited to, computing devices (e.g., laptops, tablets, smartphones, video game consoles, set top boxes, routers, WiFi hotspots), audio/visual devices (e.g., televisions, radios), appliances, electronic locks (e.g., doors, cabinets), lighting, mechanical devices with embedded control devices (e.g., processor, control board) and optional wireless communication capability, and the like.

The communications network 108 enables the short-range frequency reader 104 and/or the target device 106 to communicate with the server computing device 110—for example, if the server computing device 110 is in a different location than the short-range frequency reader 104. The network 108 may be a local network, such as a LAN, or a wide area network, such as the Internet and/or a cellular network. In some embodiments, the network 108 is comprised of several discrete networks and/or sub-networks (e.g., cellular to Internet) that enable the short-range frequency reader 104 and/or the target device 106 to communicate with the server computing device 106.

The server computing device 110 is a combination of hardware and software modules that provide resources and functionality to the short-range frequency reader 104 and/or the target device 106 as described herein. The server computing device 110 can include specialized hardware and/or software modules that execute on a processor and interact with memory modules of the server computing device 106, to perform functions associated with the system 100 for proximity access control using wearable devices, as described herein. For example, the server computing device 110 can communicate with the short-range frequency reader 104 to authenticate the wearable devices 102a-102b that are detected by the short-range frequency reader 104 and identify a user associated with one or more of the devices 102a-102b. In another example, the server computing device 110 can communicate with the target device 106 to enable or disable (or otherwise control) access to the target device 106—including specific functionality offered by the target device 106—based upon, e.g., instructions provided by the short-range frequency reader 104.

Figure 2:
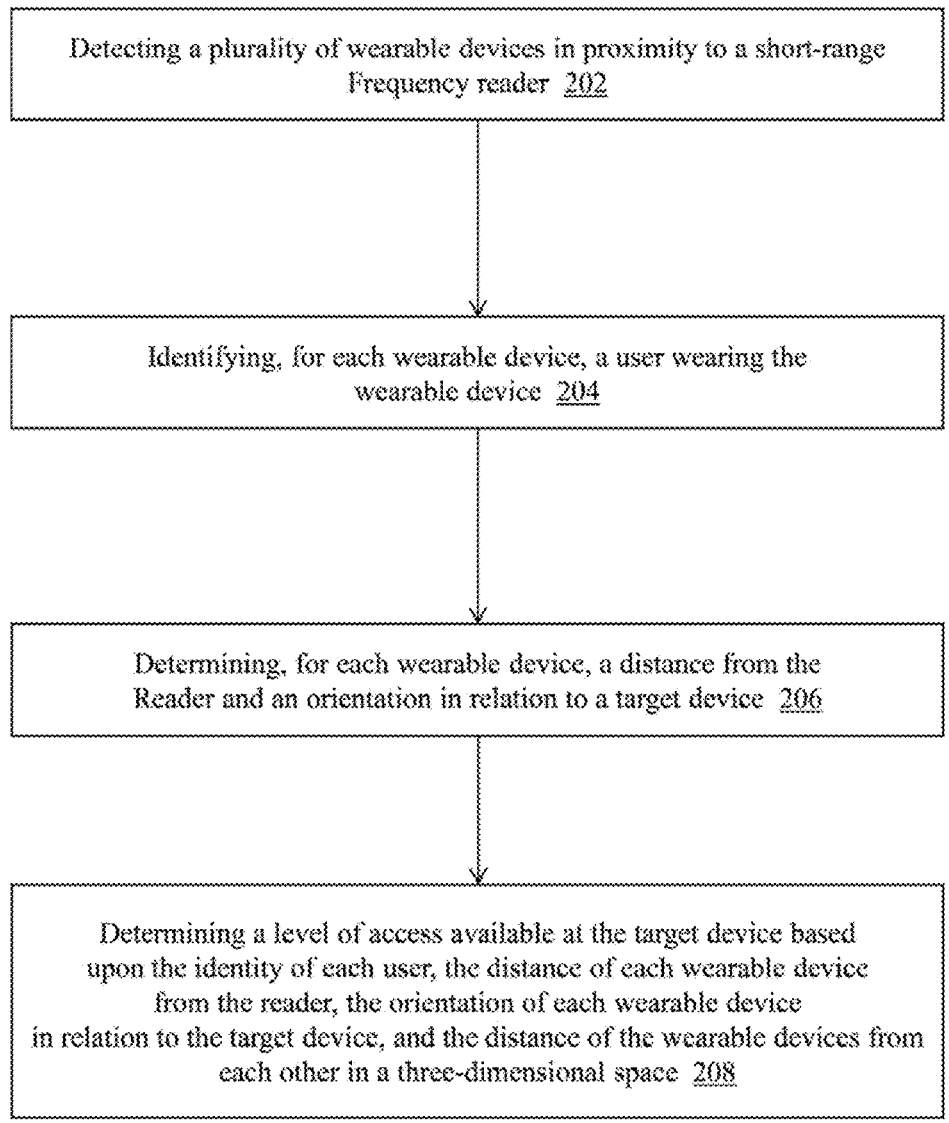
FIG. 2 is a flow diagram of a method for proximity access control using wearable devices.

FIG. 2 is a flow diagram of a method 200 for proximity access control using wearable devices, using the system 100 of FIG. 1. The short-range frequency reader 104 detects (202)

a plurality of wearable devices 102a-102b in proximity to the reader 104, which is coupled to a target device 106 that a user would like to control, operate functionality of, and/or gain access to. As described above, each wearable device 102a-102b includes a short-range frequency antenna that is capable of communicating with the reader 104 when the wearable device 102a-102b enters the operable range of the reader 104. Also, in this embodiment, each wearable device 102a-102b is associated with a specific user that is wearing the device. For example, wearable device 102a can be a smartwatch that is associated with User A and wearable device 102b can be a sensor clipped to User B's apparel. When each user approaches the reader 104, their respective wearable devices 102a-102b are interrogated by the reader 104 via wireless signal (e.g., RF, Bluetooth, NFC) and establish a connection to the reader 104. It should be appreciated that a user can wear multiple wearable devices, each of which is associated with the specific user.

The reader 104 identifies (204) a user wearing each wearable device 102a-102b. Upon establishing a connection with each wearable device 102a-102b, the reader 104 can request information from the wearable devices 102a-102b in order to identify (i) the device and (ii) a user associated with the device. In one embodiment, the device 102a, 102b can provide a device identifier (e.g., MAC address, UUID, serial number, and the like) to the reader 104, and the reader 104 can connect to the server computing device 110 and request information about the device and/or a user associated with the device by using the device identifier (e.g., a database lookup). For example, the user can establish a user profile at the server computing device 110 that contains various information that is relevant to the operation of the system 100, including but not limited to demographics (such as user's name, gender, date of birth, age, role/relationship to others (e.g., parent, child, employee)), authentication parameters (e.g., username, password), and technical attributes of the wearable device. Although a user profile is described here, it should be appreciated that there are other ways to identify a user based upon certain attributes of a wearable device.

Upon identifying the user associated with each device 102a, 102b, the reader 104 determines (206) for each wearable device 102a, 102b a distance from the reader 104 and an orientation in relation to the target device 106. For example, the reader 104 can identify that wearable device 102a is associated with a parent and wearable device 102a is associated with a child in the same household. Next, the reader 104 can determine that the parent's wearable device 102a is fifteen feet away from the reader 104 and is located behind the target device 106, while the child's wearable device 102b is three feet away from the reader 104 and is located in front of the target device 106.

The reader 104 then determines (208) a level of access available to the target device 106 based upon the identity of each user, the distance of each wearable device 102a-102b from the reader, and the orientation of each wearable device 102a-102b in relation to the target device 106. As mentioned above, the reader 104 determines that the child's wearable device 102b is three feet away from the reader 104 and in front of the target device 106, while the parent's wearable device 102a is fifteen feet away from the reader 104 and behind the target device 106. In this scenario, it could be that the child is watching television while the parent is in another room and cannot view the television. Based upon this configuration, the reader 104 can evaluate what access to provide to the television (e.g., by analyzing a user profile associated with the parent and/or the child).

For example, the user profile can contain a set of permissions associated with target device(s) 106 that the user may intend to access. For example, if the target device is a set-top box and/or television, the user profile may contain permissions associated with (i) whether the user is allowed to turn on the set-top box/television, (ii) whether the user is allowed to operate other functionality of the set-top box/television (i.e., changing channels, ordering on-demand content, accessing smart television features such as apps, games, and the like), and/or (iii) what channels the user is allowed to access. Continuing the above example, the user profiles of the parent and/or child can be configured such that the reader 104 does not allow a channel to be changed when: (a) the child's wearable device 102b is within a predetermined distance from the reader 104 and the child's wearable device 102b is in front of the television, and (b) the parent's wearable device 102a is outside of a predetermined distance from the reader 104 (or is not within operable range of the reader 104, thereby not being detected) and/or when the parent's wearable device 102a is not in front of the television (meaning that the parent cannot see what the child is viewing). In such a scenario, the system 100 restricts the functionality of the television to provide the parent with control over what the child can watch (and thus, provides peace of mind to the parent that his child is not viewing objectionable or age-inappropriate content).

In another scenario, the reader 104 can enable access to a select group of channels (e.g., kid-friendly content) when the child's wearable device 102b is in front of the television while the parent's wearable device 102a is not in front of the television. Therefore, the child is allowed to change channels but only within a set group as prescribed by the parent (e.g., in the child's user profile). When the reader 104 determines that the parent's wearable device 102a is within a predetermined distance from the reader 104 (e.g., five feet) and the device 102a is in front of the television, the reader 104 can automatically enable access to a broader range of channels (i.e., because the parent can now view the television screen and can control/monitor what the child is watching).

Therefore, the system 100 provides secure, and automatic access control to a target device 106 based upon the identity of a plurality of users with wearable devices 102a-102b in proximity to a reader 104 in conjunction with the distance of the devices 102a-102b from the reader and the orientation of the devices 102a-102b in relation to the target device 106. Also, the system 200 provides automatic modification of authentication and access control to the target device 106 as the distance and orientation of each of the wearable devices 102a-102b changes in real time. In one such example, the system 100 can require that a plurality of wearable devices 102a-102b are in proximity to the reader 104 before access is granted to the target device 106. If each of the required wearable devices 102a-102b are in proximity to the reader 104, access to the target device is enabled. However, if one of the required wearable devices 102a-102b moves so that it is no longer in proximity to the reader, access to the target device is automatically disabled as soon as the wearable device is not detected. If the missing wearable device 102a-102b is subsequently detected in proximity to the reader 104, the system 100 automatically re-enables access to the target device 106.

In addition to the example of a television as target device 106 (described above), the techniques described herein can be used in a variety of contexts to provide advantageous access control to target devices. In one example, the system 100 can be used to prevent access to certain devices based upon identity of user(s) and distance and orientation of the user's wearable device as described above. In an embodiment where the target device 106 is a medicine cabinet with a wireless locking mechanism, the reader 104 embedded in the locking mechanism can determine that a child's wearable device 102a is close to and in front of the reader 104, and that a parent's wearable device 102b is not close to the reader 104 (indicating that perhaps the child is alone). As a result, the reader 104 can issue a command to the locking mechanism to automatically lock and thereby prevent the child from gaining access to the medicine cabinet. Later, when the parent's wearable device 102a is close to and in front of the reader 104, the reader 104 can unlock the locking mechanism and allow the parent to access the cabinet (even if the child's wearable device 102b is also close by).

In another example, the target device 106 can be a computer within a secure access facility. In this example, the computer may contain highly sensitive, confidential information that only certain employees can view. The reader 104 can detect that the wearable devices 102a-102b for a plurality of employees are within a predetermined distance from the reader 104 and in front of the computer 106 (e.g., sitting at a keyboard, viewing the screen). If only one of the employees associated with the detected wearable devices 102a-102b is allowed to view information contained on the computer, the reader 104 can issue a command to the computer to disable or black out the screen (or close any open documents) while the wearable device 102b of the unauthorized employee is within a certain distance from the reader 104 and is in front of the computer. Or, perhaps the unauthorized employee is allowed to view the screen but is not allowed to print any documents from the computer. In this case, the reader 104 can issue a command to the computer to disable any print functionality while the wearable device 102b of the unauthorized employee is within a certain distance from the reader 104 and is in front of the computer.

In another example, an employee having a wearable device 102a may be escorting a contractor 102b (or other visitor) with his own wearable device 102b through a secure facility. The system 100 can monitor the wearable devices 102a-102b (e.g., in three-dimensional space) to ensure that the position and orientation of the devices conform to a required spatial relationship of each other (e.g., no more than ten feet apart and on the same floor of the facility). If the system 100 subsequently detects that the position and orientation of the devices 102a-102b do not conform to the spatial relationship (e.g., they are more than ten feet apart and/or they are no longer on the same floor), the system 100 can revoke access to any target device(s) 106 that were previously authorized, and can activate the employee's wearable device 102a to issue an alert (e.g., vibration, flashing lights) indicating that there may be a security breach.

In another example, the system 100 can require a group of people each having a wearable device in order to grant access to a target device 106—e.g., a bank may require that three particular employees having wearable devices are within a predetermined distance from a safe door before allowing the locking mechanism on the door to be unlocked. Once the wearable devices are detected within a prescribed position and orientation of a reader 104 on the safe door, the system 100 can instruct a target device (i.e., the safe lock) to open. In this example, the system 100 can be augmented with additional information about the users that are associated with the detected wearable devices. For example, the system 200 can be coupled to a camera that scans the faces of each of the employees and performs facial recognition to confirm that the people wearing the wearable devices are in fact the three specific employees that are authorized to open the safe and not impostors, or that one person is not holding or wearing all three devices. Continuing with this example, there may be a circumstance where one of the specific authorized employees is unable to be present when access to the safe is needed. The missing employee can preauthorize the wearable device of another employee to be within the group of employees/devices that, when detected by the system 100, enable access to the target device 106. As such, the group can consist of a plurality of employees (e.g., ten) and the system 100 can require that a minimum (or quorum) of employees with wearable devices are present in order to provide access.

Also, in addition to the wireless technology described above (e.g., Bluetooth, NFC, WiFi), the system 100 can operate using spatial gradient magnetic fields in order to detect the existence, distance and orientation of the wearable devices 102a-102b. For example, indoor detection and positioning of wearable devices can be affected by the composition and structure of the building in which the wearable device is located (i.e., steel, concrete, and other building materials can cause magnetic fields to behave erratically and misidentify the existence, distance, and orientation of the wearable devices). Therefore, the system 100 described herein can advantageously utilize a magnitude map in order to localize a wearable device inside a building.

For example, the reader 104 in conjunction with the server computing device 110 can be configured to identify the characteristics of magnetic field signatures in the building, as reference fingerprints to locations. The reader 104 and server computing device 110 can then adjust the positioning system to only use magnetic fingerprint matching, to reduce outliers and reject bad samples. In one embodiment, the system 100 can use a nearest neighbor algorithm to accurately locate target wearable devices, including moving devices, in real time. Such nearest neighbor algorithms are described in T. Fomby, "K-Nearest Neighbors Algorithm: Prediction and Classification," Southern Methodist University, February 2008, which is incorporated herein by reference.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A method for proximity-based and user-based access control using wearable devices, the method comprising:

detecting, by a short-range frequency reader coupled to a target device, a plurality of wearable devices in proximity to the reader, each wearable device of the plurality of wearable devices comprising a short-range frequency antenna;

retrieving, by the reader from a server computing device, a user profile that corresponds to a unique identifier stored in memory of each wearable device of the plurality of wearable devices;

determining, by the reader, a user role associated with each wearable device based upon the user profile for each wearable device;

determining, by the reader for each wearable device, a distance from the reader and an orientation in relation to the target device;

determining, by the reader, a level of access available to the target device based upon the identity of each user, the distance of each wearable device from the reader, the orientation of each wearable device in relation to the target device, and the distance of the plurality of wearable devices from each other in a three-dimensional space; and adjusting, by the reader, the level of access available to the target device based upon the determined user role for each wearable device.

2. The method of claim 1, wherein determining the level of access available to the target device comprises receiving, from the target device, an access request from an input device coupled to the target device; and determining, by the reader, whether to grant the access request based upon the identity of each user, the distance of each wearable device from the reader, the orientation of each wearable device in relation to the reader, and the distance of the plurality of wearable devices from each other in the three-dimensional space.

3. The method of claim 1, wherein the level of access available to the target device changes as the distance and orientation of each wearable device changes.

4. The method of claim 1, wherein the level of access available to the target device is no access.

5. The method of claim 1, wherein the plurality of wearable devices and the reader communicate using a short-range communication protocol.

6. The method of claim 1, wherein at least one of the distance or the orientation is determined using a magnitude map generated from magnetic field signatures of the plurality of wearable devices.

7. A system for proximity-based and user-based access control using wearable devices, the system comprising a short-range frequency reader coupled to a target device, the reader configured to:

detect a plurality of wearable devices in proximity to the reader, each wearable device of the plurality of wearable devices comprising a short-range frequency antenna;

retrieve, from a server computing device, a user profile that corresponds to a unique identifier stored in memory of each wearable device;

determine a user role associated with each wearable device based upon the user profile for each wearable device;

determine, for each wearable device, a distance from the reader and an orientation in relation to the target device;

determine a level of access available to the target device based upon the identity of each user, the distance of each wearable device from the reader, the orientation of each wearable device in relation to the target device, and the distance of the plurality of wearable devices from each other in a three-dimensional space; and adjust the level of access available to the target device based upon the determined user role for each wearable device.

8. The system of claim 7, wherein when determining the level of access available to the target device, the reader is configured to receive, from the target device, an access request from an input device coupled to the target device; and determine whether to grant the access request based upon the identity of each user, the distance of each wearable device from the reader, the orientation of each wearable device in relation to the reader, and the distance of the plurality of wearable devices from each other in the three-dimensional space.

9. The system of claim 7, wherein the level of access available to the target device changes as the distance and orientation of each wearable device changes.

10. The system of claim 7, wherein the level of access available to the target device is no access.

11. The system of claim 7, wherein the plurality of wearable devices and the reader communicate using a short-range communication protocol.

12. The system of claim 7, wherein at least one of the distance or the orientation is determined using a magnitude map generated from magnetic field signatures of the plurality of wearable devices.

13. A computer program product, tangibly embodied in a non-transitory, computer-readable storage device, for proximity-based and user-based access control using wearable devices, the computer program product including instructions operable to cause a short-range frequency reader coupled to a target device to:

detect a plurality of wearable devices in proximity to the reader, each wearable device of the plurality of wearable devices comprising a short-range frequency antenna;

retrieve, from a server computing device, a user profile that corresponds to a unique identifier stored in memory of each wearable device;

determine a user role associated with each wearable device based upon the user profile for each wearable device;

determine, for each wearable device, a distance from the reader and an orientation in relation to the target device; and determine a level of access available to the target device based upon the identity of each user, the distance of each wearable device from the reader, the orientation of each wearable device in relation to the target device, and the distance of the wearable devices from each other in a three-dimensional space; and adjust the level of access available to the target device based upon the determined user role for each wearable device.

* * * * *